(12) United States Patent
Mercado, Jr.

(10) Patent No.: US 6,956,467 B1
(45) Date of Patent: Oct. 18, 2005

(54) CAR ALARM WITH AUTOMATIC DIALER

(76) Inventor: Adelino Mercado, Jr., 15749 Puesta, Del, Sol Dr., Victorville, CA (US) 92394

( * ) Notice: Subject to any disclaimer, the term of this patent is extended or adjusted under 35 U.S.C. 154(b) by 0 days.

(21) Appl. No.: 10/395,921

(22) Filed: Mar. 24, 2003

Related U.S. Application Data

(60) Provisional application No. 60/366,288, filed on Mar. 22, 2002.

(51) Int. Cl.[7] .............................................. B60R 25/10

(52) U.S. Cl. ............................ 340/426.2; 340/425.5; 340/426.1; 340/428; 340/429; 340/426.11; 340/426.12; 340/426.13; 340/426.16; 340/426.22; 340/539.1; 340/426.17

(58) Field of Search ......................... 340/425.5, 426.1, 340/428, 429, 426.11, 426.12, 426.13, 426.16, 340/426.17, 426.22, 539.1

(56) References Cited

U.S. PATENT DOCUMENTS

| | | | | |
|---|---|---|---|---|
| 5,315,285 A | * | 5/1994 | Nykerk | 340/426.23 |
| 5,438,311 A | * | 8/1995 | Lane, Sr. | 340/426.11 |
| 5,629,693 A | | 5/1997 | Janky | |
| 5,898,391 A | * | 4/1999 | Jefferies et al. | 340/988 |
| 6,028,506 A | | 2/2000 | Xiao | |
| 6,046,687 A | | 4/2000 | Janky | |
| 6,107,914 A | | 8/2000 | Greene | |
| 6,150,923 A | | 11/2000 | Johnson et al. | |
| 6,184,801 B1 | | 2/2001 | Janky | |
| 6,240,365 B1 | | 5/2001 | Bunn | |
| 6,268,793 B1 | | 7/2001 | Rossi | |
| 6,480,098 B2 | * | 11/2002 | Flick | 340/7.2 |

* cited by examiner

*Primary Examiner*—Daryl C Pope
(74) *Attorney, Agent, or Firm*—John D. Gugliotta, Esq.; Olen L. York, III, Esq.

(57) ABSTRACT

A car alarm is providing including an annunciator for providing an alarm signal from a car alarm system and n automatic dialer that provides automatic dialing capabilities to a wireless phone or pager upon initiation of said annunciator.

17 Claims, 4 Drawing Sheets

| FUNCTION | INPUT DEVICES | TRANSMISSION MEDIUM | OUTPUT |
|---|---|---|---|
| system arming | key fob transmitter | low-power RF Link | system activation |
| Vibration alert | Vibration Sensor | wireless/telephone link & hardwired link | pager/wireless phone (if activated) & local alarm |
| Glass Breakage | Glass Breakage Sensor | wireless/telephone link & hardwired link | pager/wireless phone (if activated) & local alarm |
| Entry Detection | Door/Trunk/Hood Pin Switches | wireless/telephone link & hardwired link | pager/wireless phone (if activated) & local alarm |
| Vehicle running | ingnition Sensor | wireless/telephone link & hardwired link | pager/wireless phone (if activated) & local alarm |
| anti-jacking | anti-jacking switch | local hard-wired connection | fuel pump relay/ brake solenoid relay & local alarm |
| in-car key fob locator | local car transmitter | Low-power RF link | key-fob audio device |
| out-of-car key fob locator | remote transmitter | Low-power RF link | key-fob audio device |
| Alarm Set Notificaiton | key fob transmitter | local key-fob memory | key-fob audio device |
| Door Lock Feature | Ignition Running | Local hard-wired link | Door Lock Solenoids |
| remote arming / disarming | land-line or wireless telephone | wireless/telephone link | system activation |
| multi-car use | alpha-numeric keypad | wireless/telephone link | pager/wireless phone |
| phonebook | alpha-numeric keypad | on-board memory | automatic dialing |
| historical data | all | on-board memory | display screen |

*Fig. 3*

| FUNCTION | INPUT DEVICES | TRANSMISSION MEDIUM | OUTPUT |
|---|---|---|---|
| 250 remote start signal | all | wireless/telephone link, on-board mem. | Start Vehicle Ignition |
| 260 time and date signal | all | wireless/telephone link, on-board mem. | Display Time/Date |
| 270 memory module | all | wireless/telephone link, on-board mem. | Store Data |
| 280 engine disabling signal | all | wireless/telephone link, on-board mem. | Disable Vehicle Ignition |
| 290 tracking signal | all | wireless/telephone link, on-board mem. | Vehicle Tracking |
| 300 global position system (GPS) | all | wireless/telephone link, on-board mem. | Vehicle Tracking and Positioning |

FIG. 4

CAR ALARM WITH AUTOMATIC DIALER

RELATED APPLICATIONS

The present invention was first described in U.S. Provisional Application No. 60/366,288, filed on Mar. 22, 2002.

BACKGROUND OF THE INVENTION

1. Field of the Invention

The present invention relates generally to car alarms and, more particularly, to an apparatus that provides automatic dialing capabilities to a wireless phone or pager when presented an alarm signal from a car alarm system.

2. Description of the Related Art

Since the automobile was invented, mankind has been figuring out how to secure them from theft and unauthorized use. Many different methods of securing motor vehicles have been invented, but each has had its associated drawbacks. Door and ignition keys can be lost or picked. Anti-theft clubs or locking bars are clumsy, difficult to use as well as time consuming. Additionally, these clubs are easily defeated by bending or cutting the steering wheel. Kill switches are difficult to install, can malfunction and can also be bypassed by a semi-knowledgeable thief. Various electronic alarms provide good results, but as their use and popularity grows, they are being subjected to be being ignored. Also, if the owner or driver is out of hearing distance of the alarm horn or siren, he or she will not know of the attempted break-in, and thus will not be able to take any pre-emptive action such as calling the police. Electronic paging systems do exist to alert the owner of a possible theft via a RF link, but their range is usually limited to a few miles at best.

Numerous attempts have been made to correct for the foregoing. However, a search of the prior art did not disclose any patents that read directly on the claims of the instant invention, but the following references were considered related:

U.S. Pat. No. 6,107,914, issued in the name of Desmond Greene, describes a vehicle anti-theft and anti-vandalism alarm system;

U.S. Pat. No. 6,240,365, issued in the name of Frank E. Bunn, describes an automated vehicle tracking and service system;

U.S. Pat. No. 6,028,506, issued in the name of Wei Hao Xiao, describes a car alarm with a transmitting and paging system;

U.S. Pat. No. 6,150,923, issued in the name of William N. H. Johnson, et al, describes an alarm system for detecting theft of an article; and U.S. Pat. No. 6,268,793, issued in the name of Francesco Rossi, describes an electronic device which transmits a telephone number and/or message to another vehicle.

The following patents describe an apparatus and method for location determination and reporting U.S. Pat. No. 5,629,693, issued in the name of James M. Janky;

U.S. Pat. No. 6,046,687, issued in the name of James M. Janky; and

U.S. Pat. No. 6,184,801, issued in the name of James M. Janky.

Consequently, a need has been felt for providing an apparatus and method which provides automatic dialing capabilities to a wireless phone or pager when presented an alarm signal from a car alarm system.

SUMMARY OF THE INVENTION

It is therefore an object of the present invention to provide an improved car alarm.

It is a feature of the present invention to provide an improved car alarm that provides automatic dialing capabilities to a wireless phone or pager when presented an alarm signal from a car alarm system.

Briefly described according to one embodiment of the present invention, a Car Alarm with Automatic Dialer is provided as an apparatus that provides automatic dialing capabilities to a wireless phone or pager when presented an alarm signal from a car alarm system. The invention provides an interface and link between the car alarm system and the user or owner of the car, no matter the distance separating the two. The invention will provide numeric or alphanumeric messaging based upon the capabilities of the receiving wireless phone or pager. The invention is also capable of reporting various stages of theft to the user by way of descriptive messages that are displayed on the text readout of the receiving wireless device. These varying stages can range from minor bumping of the car, to glass breakage, to attempted starting, to engine running and the like. Additionally, in the case of a wireless phone, the user can dial up emergency law enforcement personnel also instantaneously after receiving the alarm, resulting in faster response time and the likelihood of apprehension.

An advantage of the present invention is that it discourages vehicle theft, while at the same time informs owner/driver that a theft may be occurring.

Further, the present invention uses wireless reporting device that utilizes wireless/cellular phone or pager.

DESCRIPTIVE KEY

10 car alarm with automatic dialer
15 vehicle
20 first wireless telephone tower
25 first wireless telephone radio frequency wave
30 first private land-line connection
35 central switching office
40 land-line telephone
45 second private land-line connection
50 second wireless telephone tower
55 third private land-line module connection
60 second wireless telephone radio frequency wave
65 user
70 personal wireless device
75 alarm siren or horn
80 key fob transceiver
85 first local radio frequency link
90 main controller
95 vehicle battery
100 overcurrent protective device
105 low-power transceiver
110 arm pushbutton switch
115 disarm pushbutton switch
120 recall pushbutton switch
125 small speaker
130 vibration sensor
135 glass breakage sensor
140 normally closed pin switches
145 ignition system input
150 anti-car jacking switch
155 local key fob locator switch
160 main control interface panel
165 remote key fob locator panel/switch 170 second local radio frequency link
175 fuel pump relay
180 brake solenoid relay
185 door lock relay
190 wireless telephone interface module
195 wireless telephone radio
200 multiplex driver circuit
205 multi-line alpha-numeric readout
210 numeric pushbutton switches
215 function column
220 input devices column
225 transmission medium column
230 output column
250 remote start signal
260 time and date signal
270 memory module
280 engine disabling signal
290 tracking signal
300 global position system (GPS)

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3 is a chart depicting the various input and output functions afforded by the car alarm with automatic dialer 10; and FIG. 4 is a chart depicting additional input and output functions afforded by the car alarm with automatic dialer 10.

DESCRIPTION OF THE PREFERRED EMBODIMENTS

The best mode for carrying out the invention is presented in terms of its preferred embodiment, herein depicted within the FIGS. 1 through 4.

1. Detailed Description of the Figures

Figure 1:
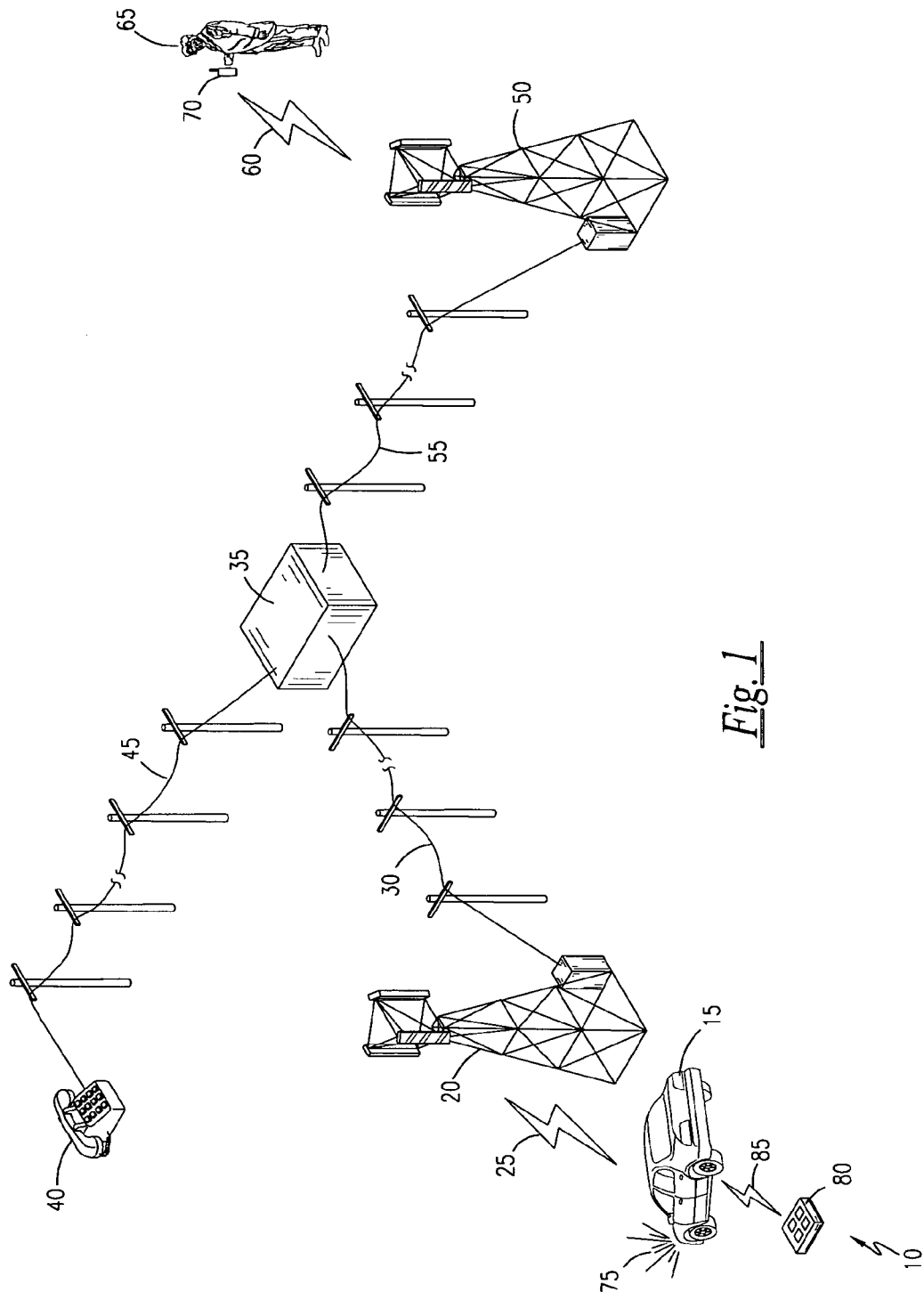
FIG. 1 is a pictorial representation of the communication path utilized by the car alarm with automatic dialer 10, according to a preferred embodiment of the present invention.

Referring first to FIG. 1, a pictorial representation of the communication path utilized by the car alarm with automatic dialer 10, according to a preferred embodiment of the present invention is disclosed. A vehicle 15 is located such that it is within range of a first wireless telephone tower 20. In the event of an alarm condition or in the event of remote data connection, a first wireless telephone radio frequency wave 25 passes data in a duplex fashion from the vehicle 15 to the first wireless telephone tower 20. The conditions under which data is passed, will be described in greater detail herein below. A first private land-line connection 30 routes the data to a central switching office 35 as would be normally expected. From the central switching office 35, the data is then routed to a land-line telephone 40 via a second private land-line connection 45, dependent on the routing information contained in the data in the first wireless telephone radio frequency wave 25. An even more useful scenario would be the routing of the data to a second wireless telephone tower 50 via a third private land-line connection 55. This would allow for the generation and transmission of second wireless telephone radio frequency wave 60 to a user 65, preferably the driver, who is in possession of a personal wireless device 70, which can be a one-way device such as a numeric or alphanumeric pager, or a two-way device such as a wireless phone. Since the user 65 would normally be in constant possession of the personal wireless device 70, instant notification of a possible event occurring at the vehicle 15, could occur. It is envisioned that if the personal wireless device 70 is a wireless phone, it would work with an analog cellular telephone, a digital cellular phone, a PCS telephone, a radio-telephone or the like. In addition to the remote communication link as aforementioned described, the car alarm with automatic dialer 10 also affords local annunciation via an alarm siren or horn 75. Also, a key fob transceiver 80, customarily provided on the user's key ring, is provided to allow for close proximity communication via a first local radio frequency link 85.

Figure 2:
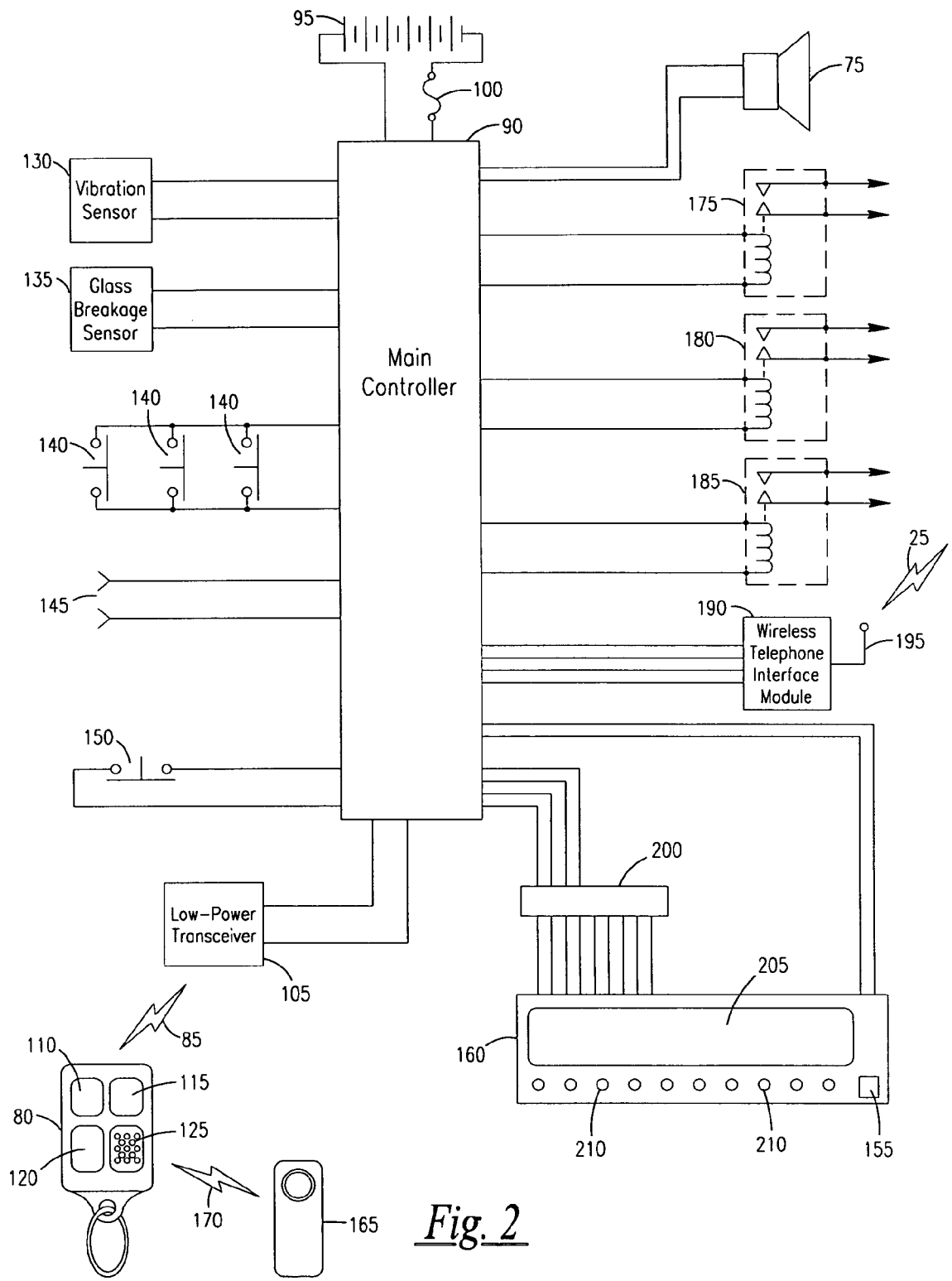
FIG. 2 is a functional block diagram which depicts the major internal components and functionality of the car alarm with automatic dialer 10.

Referring next to FIG. 2, a functional block diagram which depicts the major internal components and functionality of the car alarm with automatic dialer 10 is shown. A main controller 90 provides all control and logic functions associated with the car alarm with automatic dialer 10. The main controller 90 deciphers various inputs and provides output functions based upon a set of programmed logic. The main controller 90 is envisioned to be a programmable low-level computer chip with onboard memory, but other various such as BASIC stamp module, Programmable Logic Controller (PLC) and other devices familiar to those skilled in the art will work with equal effectiveness and as such, should not be interpreted as a limiting factor of the present invention. The main controller 90 receives continues power from a vehicle battery 95 through an overcurrent protective device 100 such as a fuse. Activation of the main controller 90 is initiated through the key fob transceiver 80 in two-way communication with a low-power transceiver 105 via a first local radio frequency link 85. The key fob transceiver 80 includes an arm pushbutton switch 110, a disarm pushbutton switch 115, a recall pushbutton switch 120, and a small speaker 125. The arm pushbutton switch 110 and the disarm pushbutton switch 115 is used to arm and disarm the car alarm with automatic dialer 10, respectively in a conventional manner from close range within 100'. The recall pushbutton switch 120, when pressed, will cause the emission of two beeps from the small speaker 125, if the last command issued from the key fob transceiver 80 was from the arm pushbutton switch 110, or will cause the emission of one beep from the small speaker 125, if the last command issued from the key fob transceiver 80 was from the disarm pushbutton switch 115. This feature is viewed as being particularly useful if the user 65 (as seen in FIG. 1) forgets whether or not he or she armed the system when last leaving the vehicle 15 (as seen in FIG. 1). A vibration sensor 130 provides an activation signal to the main controller 90 in the event of tampering with the vehicle 15 (as seen in FIG. 1). Said vibrations can arise from attempted door opening, jacking up of the vehicle, towing of the vehicle, or the like. A glass breakage sensor 135 provides an activation signal to the main controller 90 in the event of glass breakage on the vehicle 15 (as seen in FIG. 1). Said breakage can occur when a thief attempt to gain entry to a vehicle for purposes of theft of the vehicle, or during a "smash and grab" in which the thief grabs objects such as purses, electronics, briefcases or the like from the interior of the vehicle. A series of normally closed pin switches 140 located on all doors, trunks, hoods and hatches of the vehicle provide an activation signal to the main controller 90 in the event of said openings being accessed. An ignition system input 145 provides an activation signal to the main controller 90 in the event of the ignition system being energized which is indicative of the engine running. An anti-car jacking switch 150 is provided near the seat belt release for the driver and of a protected nature so not as to be accidently activated. The anti-car jacking switch 150 provides a signal to the main controller 90 that an attempted car jacking has occurred. Should the user 65 (as seen in FIG. 1) lose their keys and the key fob transceiver 80 within the vehicle confines, a local key fob locator switch 155 is provided on a main control interface panel 160, which, when activated, instructs the low-power transceiver 105 to send a first local radio frequency link 85 instructing the small speaker 125 on the key fob transceiver 80 to beep. If the key loss should occur away from the vehicle 15 (as seen in FIG. 1), such as in the home of the user 65 (as seen in FIG. 1), a remote key fob locator panel/switch 165 will issue a second local radio frequency link 170 instructing the small speaker 125 on the key fob transceiver 80 to beep. The remote key fob locator panel/switch 165 is envisioned to plug into a conventional 120 VAC, 60 hZ, wall outlet, such that its location will always be known and easy to find. In addition to the customary output of the alarm siren or horn 75, a fuel pump relay 175 is provided to disengage the fuel pump on the vehicle 15, after a set time delay envisioned to be approximately 30 seconds, but adjustable by the user 65 (as seen in FIG. 1) via the main control interface panel 160. A brake solenoid relay 180 is provided to gently engage the brake system on the vehicle 15, after a set time delay envisioned to be approximately 35 seconds, but adjustable by the user 65 (as seen in FIG. 1) via the main control interface panel 160. A door lock relay 185 is provided to automatically lock and unlock the power door locks (if so equipped) on the vehicle 15 (as seen in FIG. 1). A wireless telephone interface module 190, with a corresponding wireless telephone radio frequency antenna 195, is provided to allow the main controller 90 to interface with a telephone network, thus allowing full duplex communication via the first wireless telephone radio frequency wave 25. The commands and information issued by the wireless telephone interface module 190 will be described in greater detail in FIG. 3. The main control interface panel 160 provides all programming and interface instructions to the main controller 90 via a multiplex driver circuit 200. Instructional output from the main controller 90 is displayed on a multi-line alpha-numeric readout 205 on the main control interface panel 160, and instructional input is provided by a plurality of numeric pushbutton switches 210. The numeric pushbutton switches 210 in their normal configuration provided numeric input, but can be modified by well-known internal programming of the multiplex driver circuit 200 and main control interface panel 160 to provide alphanumeric input as well. The main control interface panel 160 is envisioned to be located within the passenger compartment of the vehicle 15 (as seen in FIG. 1) so as to provide easy access. The main controller 90 along with most of the aforementioned described elements are envisioned to be located within a hidden location on the vehicle 15 (as seen in FIG. 1) so as to prevent tampering and removal by an unauthorized individual. Should the main control interface panel 160 be forcibly removed by an unauthorized individual, the main controller 90 will continue to perform its various input and output activities per its latest received commands.

Referring finally to FIG. 3, a chart depicting the various input and output functions afforded by the car alarm with automatic dialer 10, is depicted. Due to the fact that the car alarm with automatic dialer 10 is capable of operating in multiple modes, the chart format of FIG. 2, best demonstrates the multiple modes of operation. Element numbers previously used are as seen and described in FIG. 1 and FIG. 2. A function column 215 describes the operating mode or modes at the various stages of operation. An input devices column 220 describes the corresponding input functions and/or devices that go with the respective function. A transmission medium column 225 describes the corresponding transmission medium that occurs, whether it is a long distance RF link, a local RF link, or a hardwired electrical connection. Finally, an output column 230 describes the corresponding output functions that occur as a result of the respective function.

Initial utilization of the car alarm with automatic dialer 10 occurs with system arming by the use of the key fob transceiver 80 via the first local radio frequency link 85 in a manner customarily familiar to conventional automobile alarm systems. As a result of this function, the car alarm with automatic dialer 10 is armed.

Should the vehicle 15 be subject to tampering that causes vibrations to be felt throughout the vehicle, the vibration sensor 130 will be activated. This will cause the alarm siren or horn 75 to be activated as well as a connection to the telephone network through the wireless telephone interface module 190 if so desired by the user 65 and programmed via the main control interface panel 160. The preferred connection is via a text message to a personal wireless device 70 such as a wireless telephone or alphanumeric pager. Such a feature allows notification of unauthorized tampering anywhere in the world. The notification can also be made to a land-line telephone 40 with notification via voice synthesis from the wireless telephone interface module 190 in lieu of text messaging. Should the vehicle 15 be subject to impacted or broken glass, the glass breakage sensor 135 will be activated. This will cause the alarm siren or horn 75 to be activated as well as a connection to the telephone network through the wireless telephone interface module 190 if so desired by the user 65 and programmed via the main control interface panel 160, as aforementioned described. Should entry be gained to the vehicle 15, the corresponding normally closed pin switches 140 will issue a signal to the main controller 90. This will cause the alarm siren or horn 75 to be activated as well as a connection to the telephone network through the wireless telephone interface module 190. An identical response will occur should the ignition system of the vehicle 15 be activated causing the ignition system input 145 to issue a signal.

If an attempt by an unauthorized individual be made to car-jack the vehicle 15, the user 65 would activate the anti-car jacking switch 150, located near the seat belt release, as he or she leaves the vehicle. After a suitable time delay, the main controller 90 will stop fuel flow to the engine of the vehicle 15 by activation of the fuel pump relay 175, followed shortly by the gentle activation of the braking system by the door lock relay 185. Additionally, the alarm siren or horn 75 will begin sounding after the brakes, further drawing attention to the stolen vehicle 15.

If the user 65 should lose his or her keys with the key fob transceiver 80 attached inside of the vehicle 15, a press of the local key fob locator switch 155 will cause the small speaker 125 on the key fob transceiver 80 to beep, thus aiding in their location. If the user 65 should lose his or her keys with the key fob transceiver 80 attached inside of a home, activation of the remote key fob locator panel/switch 165 will cause the small speaker 125 on the key fob transceiver 80 to beep, thus aiding in their location.

Should the user 65 forget whether or not the car alarm with automatic dialer 10 was armed when last leaving the vehicle, a simple press of the recall pushbutton switch 120 will cause the emission of two beeps from the small speaker 125, if the last command issued from the key fob transceiver 80 was from the arm pushbutton switch 110, or will cause the emission of one beep from the small speaker 125, if the last command issued from the key fob transceiver 80 was from the disarm pushbutton switch 115. While this will not allow the user 65 to arm or disarm the car alarm with automatic dialer 10, as the distance between the key fob transceiver 80 and the low-power transceiver 105 is too great, it will reduce anxiety of the user 65 or instruct the user 65 to return to the vehicle 15 to protect it by arming the car alarm with automatic dialer 10.

If so desired, the main controller 90 has the capability to automatically lock the doors of the vehicle 15 by use of the door lock relay 185 when the vehicle 15 is running by use of the ignition system input 145 input signal. This would allow for the automatic locking of the doors when the vehicle ignition is deactivated as well. Should the user 65 wish, the doors can be automatically locked when the car alarm with automatic dialer 10 is armed and automatically unlocked when the car alarm with automatic dialer 10 is disarmed as well. These features and their levels of activation are enabled and disabled through a menu-driven system on the main control interface panel 160.

The car alarm with automatic dialer 10 is capable of remote arming and disarming through the wireless telephone interface module 190 as well. Should the user wish to disarm the car alarm with automatic dialer 10, a telephone call, from any phone in the world, is placed to the wireless telephone interface module 190. After an authorization code is entered, the user 65 is granted permission to activate or deactivate the car alarm with automatic dialer 10. This feature is envisioned as being particularly beneficial in cases where the vehicle 15 is under the supervision of another person, such as when it is in for service. After dropping the vehicle 15 off, the user 65 would activate the system via the key fob transceiver 80, and only leave the keys with the service attendant. When the attendant was ready to work on the vehicle 15, a call would be placed to the user 65 who would then place another call to the car alarm with automatic dialer 10 to deactivate it. Thus, complete protection and knowledge of work is afforded without compromising security.

The car alarm with automatic dialer 10 through use of the main control interface panel 160 is enabled to preprogram the messages that are transmitted as text messages, or as voice synthesis messages, for each instance of activation or interface. This allows the user 65 who has two or more vehicles equipped with the car alarm with automatic dialer 10 to differentiate between the vehicles. Such tagging is envisioned to be the year and make of the vehicle, such as "1997 CHEVROLET CORVETTE" or "2000 HONDA PRELUDE." Additionally, the nature of the problem, such as "VIBRATION," "GLASS BREAKAGE," "UNAUTHORIZED ENTRY," or "VEHICLE ENGINE RUNNING," could also be displayed or annunciated.

The car alarm with automatic dialer 10 through on board programming, would allow the entry of up to 20 different telephone numbers to be called and the order to call them. Such action ensures security actions will be taken eventually regardless of unanswered calls, wireless service interruption, wireless devices that are out of range or turned off, or the like. Such a feature allows the user 65 to program in different number as telephone numbers change, the user 65 moves, or the user 65 sells the vehicle 15 with the installed car alarm with automatic dialer 10 to another individual.

Finally, the car alarm with automatic dialer 10 through onboard memory is capable of retaining a history of stored events. Said log is available through the main control interface panel 160 and a menu-driven system. Such a feature is envisioned as being valuable for usage monitoring, and possible legal evidence in the event of a theft or attempted theft.

Other options possible with the aforementioned input or outputs along with the addition of minimal hardware are also envisioned. First, the addition of a battery back is envisioned. This will still allow the car alarm with automatic dialer 10 to operate in the event the cable going to the vehicle battery 95 are cut, or the vehicle battery 95 is dead. Second, the addition of another relay would allow for the automatic closing and opening of power windows and power roofs upon alarm activation and deactivation respectively. Third, the addition of a starting relay would allow the remote starting of the vehicle 15 via the wireless telephone interface module 190 on cold days and morning. Activated run time can be programmed by the user 65 at the main control interface panel 160. This feature will automatically stop the vehicle 15 unless a key is inserted into the ignition. Fourth, with the addition of a Global Positioning System (GPS) receiver, the car alarm with automatic dialer 10 would be capable of reporting its position in electronic format via the wireless telephone interface module 190. This could also be used in car-jacking or hijacking situations where the user 65 remains driving the car under duress. An additional hidden switch will activate such tracking and reporting to another telephone number not carried by the user 65. Fifth, the addition of one or more cameras will allow the recording of drivers, operating conditions, surrounding scenery and the like. Such information would be recorded and time-stamped on a CD or DVD for later use as legal evidence in the case of a theft or attempted theft. Such video images can also be transmitted in real time by the wireless telephone interface module 190 to other devices capable of displaying such images.

As seen by FIG. 4, an additional embodiment is envisioned in which a remote start signal 250 is provided to permit ignition engagement of any type of vehicle, and including engine types varying between four cylinders up to and including twelve cylinders. Furthermore, the remote start signal 250 permits ignition engagement of automatic and/or manual transmissions. It is envisioned that a user desirous of the remote start signal 250 option will be able to purchase the option tailored to the type of vehicle the user operates.

A further additional embodiment includes the incorporation of a time and date 260 display accurately calibrated via electronic communication with recognized standards, such as atomic clocks (including one of the type found at Fort Collins, Colo.). It is envisioned that the time and date 260 display is automatically adjustable for daylight savings and leap year calculations, among other similar adjustments.

An additional embodiment includes a memory module 270 for the storage of information. The inclusion of a memory module 270 permits restoration of phone lists, codes, times, dates, locations, histories, and other important data if power source disconnection is experienced.

An additional embodiment includes a engine disabling signal 280. The inclusion of the engine disabling signal 280 permits remote shut-down of the user's automobile engine in case of theft, for instance. By way of example, and not a means for limiting the scope of the application and claims, if a thief should abscond with a user's keys by either force or deception, the user can depress the engine disabling signal 280 to initiate the shut-down of the automobile engine. In one example, the engine disabling signal 280 will permit the automobile to travel a predetermined distance from the point of theft before the engine cuts-out and/or a constant application of brake is applied to slow and then stop the vehicle. It is further envisioned that in tandem with disabling the engine, the engine disabling signal 280 will entrap the thief within the vehicle, locking all means of escape, with the goal of restraining the thief until the proper authorities apprehend the thief. It is also envisioned that the actuation of the engine disabling signal 280 will also actuate a tracking signal 290, thereby permitting tracking of the stolen vehicle if the predetermined distance is impracticable for foot pursuit or visual recognition.

A further embodiment includes the incorporation of a mechanism for bypassing devices that presently permit thieves to use a separate transmitter to override the present invention and then control the present invention. As such, the user may input an additional remote transmitter before theft, and will allow the user to later override one of the transmitters and actuating the second inputted transmitter. The override to the second transmitter will then allow the user to disable the original transmitter being used by the thief. Also envisioned is the capability of the transmitter to remotely contact the user via phone, or other similar means, to provide instruction as to the present situation. Furthermore, the user is envisioned to be able to return a signal to the transmitter so as to disarm the transmitter.

A further embodiment includes the incorporation of a portable global positioning system (GPS) 300 in which the portable GPS 300 provides two outlet sources, one in which directly draws power from the car alarm dialer 10. The portable GPA 300 includes an integrated monitor to disseminate visual information, including video transmission or graphical display of a map, for instance. The GPS 300 includes features such as zoom in and zoom out, routing, and pagination, among other possibilities. The GPS 300 may receive data transmission via satellite communication, therefore averting the need for dial-up downloading of data.

Another embodiment envisions the integration of a menu system allowing for the choice and application of various languages, including English, Spanish, French, Japanese, and other popular international languages. It is also envisioned that the system will allow for interlanguage translations of texts, etc.

Other embodiments envisioned include the incorporation of caller ID display, a history recall, a door and/or trunk actuation key, and other similar means.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The preferred embodiment of the present invention can be utilized by the common user in a simple and effortless manner with little or no training. After acquisition of the car alarm with automatic dialer 10, it must be installed on the vehicle 15 in general accordance with FIG. 2. The user 65 would then program the main controller 90 through the main control interface panel 160 with regards to password selection, option activation, telephone numbers to call and the like. After testing, the car alarm with automatic dialer 10 is ready for use.

To use the present invention, the user would simply press the arm pushbutton switch 110 on the key fob transceiver 80 in a customary manner when leaving the vehicle. Upon returning, a press of the disarm pushbutton switch 115 on the key fob transceiver 80 would disarm it. Should an attempt be made to gain unauthorized access to the vehicle 15, the various aforementioned sensors would initiate input signals to the main controller 90. These inputs would then be acted up, dependent on prior programming as aforementioned described, to activate various output scenarios, activate local alarm horns, or place a telephone call via the wireless telephone interface module 190. These actions allow the user 65 to take immediate action by calling local law enforcement personnel to thus avoid possible theft of the vehicle 15.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. A vehicle alarm comprising:
    a main controller for providing control and logic functions and for deciphering a plurality of inputs and provides output functions based upon a set of programmed logic;
    first communication means capable of transmitting low powered alarm transmission;
    second communication means and an automatic dialer that provides automatic dialing capabilities to a personal wireless device upon initiation of an annunciator output function;
    a key fob transceiver in two-way communication with said first communication means to allow for close proximity communication between said first communication means and said key fob transceiver; and
    remote key fob locator means, wherein said key fob transceiver includes:
        an arm pushbutton switch used to arm the car alarm from close range within 100 feet;
        a disarm pushbutton switch used to disarm the car alarm from close range within 100 feet;
        a recall pushbutton switch capable of recalling the last command issued from the key fob transceiver;
        annunciator means for sounding an audible alarm.

2. The vehicle alarm of claim 1, wherein said main controller output functions include a fuel pump relay to disengage a fuel pump on a vehicle after a set time delay adjustable by a user.

3. The vehicle alarm of claim 1, wherein said main controller output functions include a brake solenoid relay to gently engage a brake system on a vehicle after a set time delay adjustable by a user.

4. The vehicle alarm of claim 1, wherein said main controller output functions include a door lock relay to automatically lock and unlock a power door lock on a vehicle.

5. The vehicle alarm of claim 1, wherein said main controller further comprises:
a main control interface panel for providing all programming and interface instructions to said main controller via a multiplex driver circuit and instructional outputs from said main controller for display on a multi-line alpha-numeric readout on said main control interface panel.

6. The vehicle alarm of claim 5, wherein said main control interface panel is located within a passenger compartment of the vehicle.

7. The vehicle alarm of claim 1, wherein said remote key fob locator means functions to activate said annunciator means.

8. The vehicle alarm of claim 5, wherein said main control interface panel is enabled to preprogram a messages that are transmitted as text messages, or as voice synthesis messages, for each instance of activation or interface.

9. The vehicle alarm of claim 1, further comprising, in combination, a Global Positioning System (GPS) receiver capable of reporting its position in electronic format to said second communication means via said main controller.

10. The vehicle alarm of claim 1, further comprising, in combination: one or more cameras to allow for recording of drivers, operating conditions, surrounding scenery and other conditions within an interior of a vehicle.

11. The vehicle alarm of claim 10, wherein information recorded by said cameras recorded and time-stamped on a storage medium for later use as legal evidence in case of a theft or attempted theft.

12. The vehicle alarm of claim 1, wherein a plurality of inputs comprise:
a vibration sensor for providing an activation signal to said main controller in the event of tampering with a vehicle;
a glass breakage sensor for providing an activation signal to the main controller in the event of glass breakage on the vehicle;
a series of normally closed pin switches located on all doors, trunks, hoods and hatches of the vehicle for providing an activation signal to the main controller in the event one of said doors, trunks, hoods or hatches are accessed;
an ignition system input for providing an activation signal to the main controller in the event of an ignition system being energized which is indicative of a running engine;
an anti-car jacking switch provided near a seat belt release for a driver, said anti-car jacking switch recessed so not as to be accidently activated; and
said anti-car jacking switch providing a signal to the main controller that an attempted car jacking has occurred.

13. The vehicle alarm of claim 1, wherein said personal wireless device is selected from the group consisting of a wireless phone, an analog cellular telephone, a digital cellular phone, a PCS telephone, a radio-telephone, and a pager.

14. The vehicle alarm of claim 1, wherein said main controller provides output functions includes activation of an alarm siren.

15. The vehicle alarm of claim 1, wherein said main controller comprises a programmable low-level computer chip with onboard memory.

16. The vehicle alarm of claim 1, wherein said main controller comprises a Programmable Logic Controller.

17. The vehicle alarm of claim 1, wherein said main controller can be activated through said key fob transceiver.

* * * * *